Figure 1:
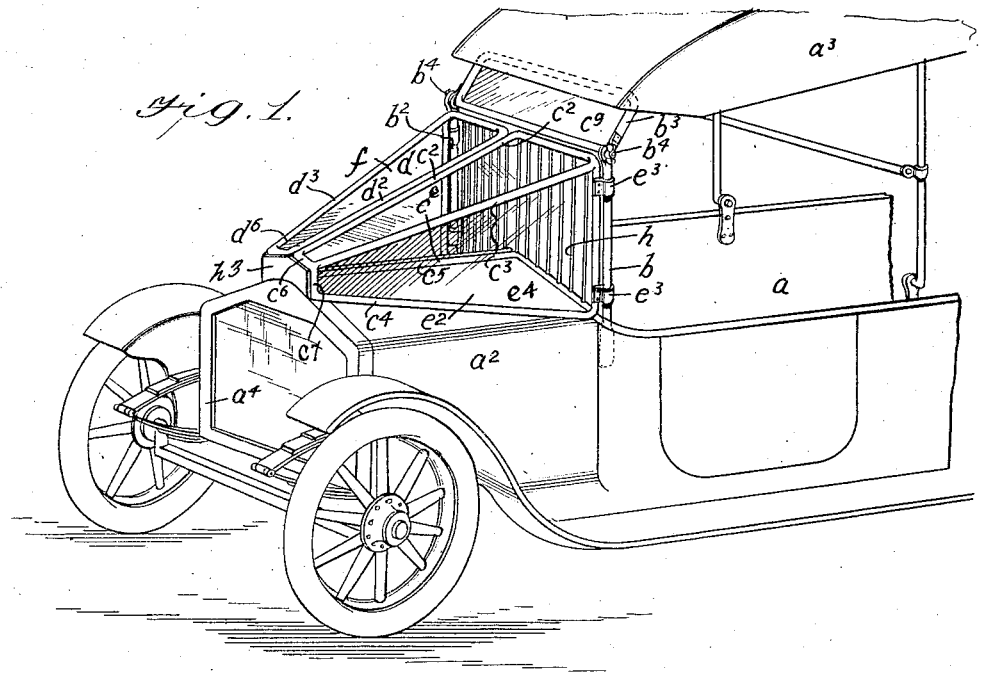

J. L. STRICKLER.
WIND SHIELD.
APPLICATION FILED MAY 26, 1914.

1,146,666.

Patented July 13, 1915.
2 SHEETS—SHEET 1.

WITNESSES

INVENTOR
Jacob L. Strickler
BY
ATTORNEYS

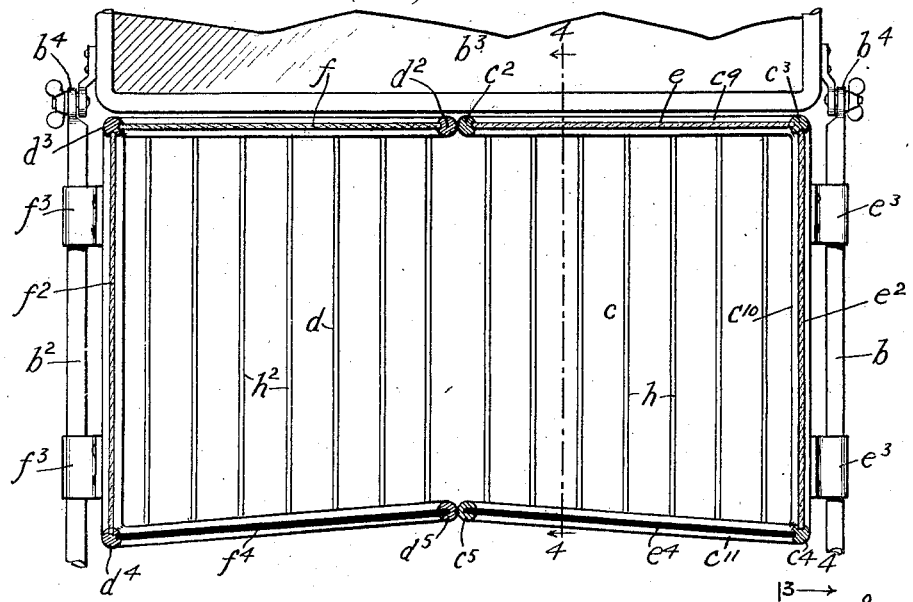
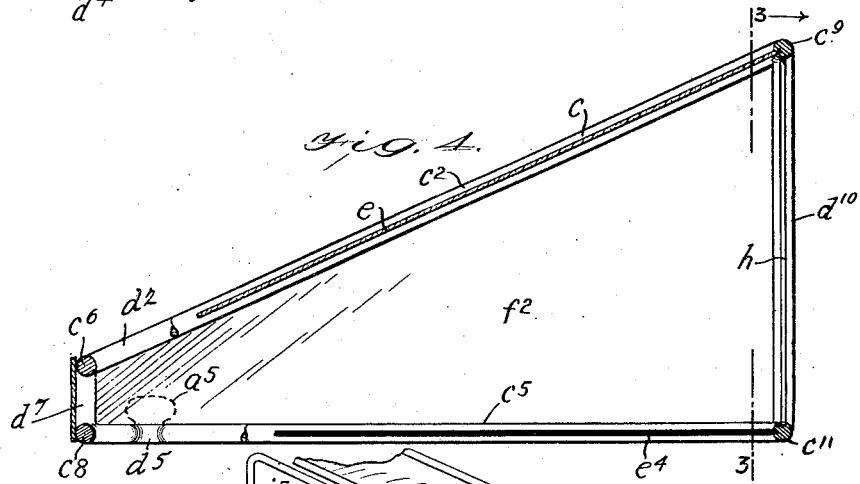
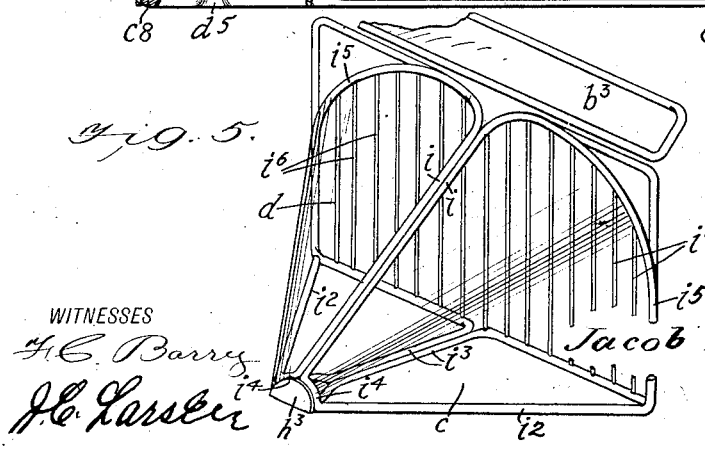

UNITED STATES PATENT OFFICE.

JACOB L. STRICKLER, OF DENVER, COLORADO.

WIND-SHIELD.

1,146,666.

Specification of Letters Patent. Patented July 13, 1915.

Application filed May 26, 1914. Serial No. 841,026.

*To all whom it may concern:*

Be it known that I, JACOB L. STRICKLER, a citizen of the United States, and resident of Denver, in the county of Denver and State of Colorado, have invented certain new and useful Improvements in Windshields, of which the following is a specification.

My invention relates to wind shields for automobiles and which are adapted to deflect the wind above and to each side of the occupants of the automobile, as well as deflecting dust and flying particles of matter, and one of the main objects is to remove the glass usually employed in such shields away from the zone of danger to the automobile occupants in the event of sudden stoppages, as in collisions and the like.

A further object is to extend the shield proper forwardly over the bonnet of the engine and the radiator and to form the same of two independent frames having glass panels and hinged, each, to a fixed part of the automobile, whereby said frames are independently swung outwardly from the engine bonnet, as when access to the engine is desired, or for filling the radiator.

A further object is to provide a series of vertically arranged rods at the rear of my shield, and in the position of the usual shield, to take the impact of persons in the automobile in the event of a collision and which will not obstruct the view of the chauffeur; and a further object is to provide a sheet metal bottom for the independent shield members whereby said members are held firmly on the engine bonnet and whereby said frames or members are made more rigid than if such bottom were not provided.

My invention is fully set forth in the following specification, of which the accompanying drawings form a part, in which the same reference characters are used to designate the same parts in each of the views, and in which:—

Figure 2:
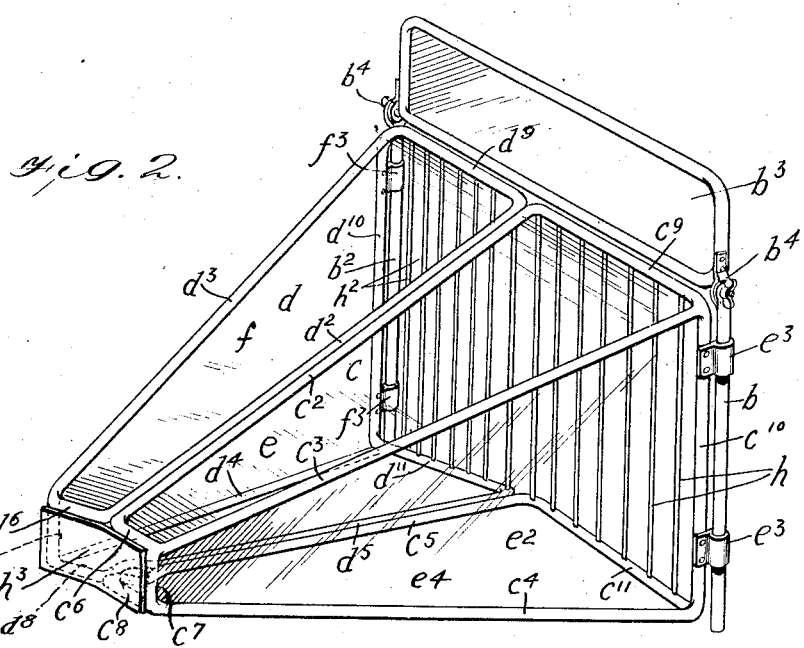

Figure 1 is a perspective view of a portion of an automobile provided with my invention; Fig. 2 is an enlarged view of my invention removed from the automobile, but showing its connection therewith; Fig. 3 is a section taken on the line 3—3 of Fig. 4; Fig. 4 is a section taken on the line 4—4 of Fig. 3, and partly broken away; and Fig. 5 is a view of a modification of the form shown in the preceding figures.

In Fig. 1 of the drawings forming a part of this application I have shown a portion of an automobile having the usual, or any other, body $a$, engine bonnet $a^2$, and hood $a^3$, a radiator $a^4$ and an inlet $a^5$ therefor, said inlet being indicated in dotted lines in Fig. 4. At the rear of the engine bonnet and on each side of the body $a$ are two uprights $b$ and $b^2$, securely bolted or otherwise secured to the body $a$, and said uprights correspond in position to the usual wind shield as now provided and carry the sub-shield $b^3$ hinged thereto at $b^4$.

My shield comprises two similar members $c$ and $d$, the former of which is formed of a frame composed of four longitudinally arranged bars $c^2$, $c^3$, $c^4$ and $c^5$, front top, side and bottom bars $c^6$, $c^7$ and $c^8$, and rear top, side and bottom bars $c^9$, $c^{10}$ and $c^{11}$, respectively, all preferably brazed together and rounded at the corners, top and side panels of glass being held therein, as shown at $e$ and $e^2$, respectively, and the member so formed is hinged, at $e^3$, to the upright $b$ whereby it may be swung outwardly, and I also provide a bottom panel $e^4$ of sheet metal, both for added strength and for contact with the top of the engine bonnet.

The member $d$ is formed of four longitudinally arranged bars $d^2$, $d^3$, $d^4$ and $d^5$, joined at the front by top, side and bottom bars $d^6$, $d^7$ and $d^8$, respectively, and at the rear by top, side and bottom bars $d^9$, $d^{10}$ and $d^{11}$, all brazed together and rounded at the corners, top and side panels of glass being held therein, as shown at $f$ and $f^2$; the said member $d$ is hinged at $f^3$ to the upright $b^2$ and is provided with a sheet metal bottom in a manner similar to the member $c$, the bottom panels of both members $c$ and $d$ being cut away in the position of the radiator inlet to permit the bars $c^2$ and $d^2$ to touch each other, Arranged between the top and bottom bars $c^9$ and $c^{11}$ are a plurality of equidistantly spaced, vertical, rods $h$ and similarly arranged between the top and bottom bars $d^9$ and $d^{11}$ are rods $h^2$ collectively forming a guard for the protection of the chauffeur or passengers in the event of a collision against injury from broken glass and from being thrown through the glass as is now possible with the conventional shields.

Secured at the front of the shield, either to the bottom panel or to the front end bars, or both, of one of the members is a plate $h^3$ which prevents the entry of wind or dust to the inner part of the shield, or said plate may be made in two parts, each of which may be secured to the corresponding member c or d, and, although not shown in the drawings. I will probably employ a catch or lock at the front ends of the said members to secure the same in closed position but, as any form of catch or lock may be employed, no effort is made to show or describe any particular form.

The engine bonnets of automobiles are generally downwardly and outwardly inclined, as shown, and I form my shield frames accordingly, there being many and constantly changing configurations of the bonnets, but my shield is readily adaptable to all as all that is necessary is to bend the bottom bars of the frames to suit, and form the front plate $h^3$ accordingly. Dash cowls are also used in some makes of automobiles, and I will so form the members of my shield as to conform thereto, these adaptations being arbitrary as will be seen, my invention not consisting of any particular form other than such as will extend substantially the length of the engine bonnet, radiator, and cowl, of two glass inclosed members in hinged connection with the automobile, and provided with the rear guard for protection of the automobile occupants, an alternative form being shown in Fig. 5 wherein the members of the shield are composed, each, of but three longitudinal bars $i$, $i^2$, and $i^3$ joined by curved end bars $i^4$ and $i^5$ and having guard rods $i^6$, the glass panels in such form being also curved to conform to the said end bars.

Because of the upward and rearward inclination of the top panels, and the outward and rearward inclination of the side panels, wind and dust are deflected from the automobile occupants, and the sub-shield may be inclined at desired angles to assist in this result or to ventilate the interior of the automobile, and it will be seen that access to either the engine or radiator is readily possible, and the glass panels of my shield may be easily cleansed inside and outside.

Without limiting myself to any specific form, or to details of construction other than come within the scope of the following claims, what I claim as new, and desire to secure by Letters Patent, is:—

1. The combination with an automobile having a body, engine bonnet and radiator; of a wind-shield consisting of front, top, and side plates, extending throughout the length of and conforming to the configuration of said bonnet, and a rear support for said shield connected with said body.

2. The combination with an automobile having a body, engine bonnet and radiator; of a wind-shield consisting of front, top, and side plates, said front plate resting upon said radiator, said side plates resting upon said bonnet, and a rear support for said shield connected with said body.

3. The combination with an automobile having a body, engine bonnet and radiator; of a wind-shield consisting of front, top, and side plates, extending throughout the length of and conforming to the configuration of said bonnet, and divided into two distinct members, and a support on said body for each member permitting the movement of said members toward or from each other.

4. The combination with an automobile having a body, engine bonnet and radiator; of a wind shield composed of two members joined on the central, longitudinal, vertical, plane of said automobile, each member being formed of a front, top, and side, plates, extended throughout the length of and conforming to the shape of said bonnet, a rear support for each member, and hinged connections therebetween, said top and side plates being composed, each, of a metal frame and a glass panel inclosed thereby.

5. The combination with an automobile having a body, engine bonnet and radiator; of a wind-shield composed of two members divided on the central longitudinal line of said automobile, a support at the rear of each member, hinged connections therebetween, and a plurality of vertical bars forming a guard at the rear of said windshield, said members extending for the length of and conforming to said bonnet.

6. The combination with an automobile having a body, engine bonnet and radiator; of a wind-shield consisting of front, top, side, and bottom plates, said bottom plate resting on and conforming to the configuration of said bonnet, and a rear support for said wind-shield.

7. The combination with an automobile having a body, engine bonnet and radiator; of a wind-shield consisting of two similar members formed of a front, a top, and a side plate, each, extended throughout the length of and conforming to the shape of said bonnet, a pivotal support for each member carried by said body, and a barred guard for the rear of said wind-shield.

8. The combination with an automobile having a body, engine bonnet and radiator; of a wind-shield comprising a box-shaped casing extending throughout the length of and conforming to the shape of said bonnet and in close contact therewith, the top and sides of said shield being upwardly and outwardly flared, respectively, rearwardly of said automobile.

9. The combination with an automobile having a body, engine bonnet and radiator; of a wind-shield comprising a box-shaped casing extending throughout the length of and conforming to the shape of said bonnet and in close contact therewith, the top and sides of said shield being formed of sheets of transparent material and rearwardly flared outwardly of said automobile.

10. The combination with an automobile having a body, engine bonnet and radiator; of a wind-shield comprising a box-like casing extending for the length of and conforming to the shape of said bonnet, the top and sides of said shield being rearwardly and outwardly flared, a support for the rear of said shield, and hinged connections between said shield and support.

In testimony that I claim the foregoing as my invention I have signed my name in presence of the subscribing witnesses.

JACOB L. STRICKLER.

Witnesses:
S. J. SACKETT,
E. M. RECORD.